(12) United States Patent
Degre et al.

(10) Patent No.: US 8,887,804 B2
(45) Date of Patent: Nov. 18, 2014

(54) VISCOELASTIC COMPOSITION WITH IMPROVED VISCOSITY

(75) Inventors: Guillaume Degre, Lamartine Talence (FR); Mikel Morvan, Jacques Ellul Pessac (FR)

(73) Assignee: Rhodia Operations, Aubervilliers (FR)

( * ) Notice: Subject to any disclaimer, the term of this patent is extended or adjusted under 35 U.S.C. 154(b) by 395 days.

(21) Appl. No.: 13/257,520

(22) PCT Filed: Feb. 10, 2010

(86) PCT No.: PCT/EP2010/051633
§ 371 (c)(1),
(2), (4) Date: Jan. 3, 2012

(87) PCT Pub. No.: WO2010/105879
PCT Pub. Date: Sep. 23, 2010

(65) Prior Publication Data
US 2012/0111562 A1    May 10, 2012

(51) Int. Cl.
*E21B 43/22* (2006.01)
*C09K 8/584* (2006.01)

(52) U.S. Cl.
CPC ............ *C09K 8/584* (2013.01); *C09K 2208/30* (2013.01); *Y10S 507/936* (2013.01)
USPC .................. 166/270.1; 166/275; 166/305.1; 507/244; 507/247; 507/936

(58) Field of Classification Search
USPC ............ 166/270.1, 275, 305.1; 507/244, 247, 507/936
See application file for complete search history.

(56) References Cited

U.S. PATENT DOCUMENTS

| | | | |
|---|---|---|---|
| 6,258,859 B1 * | 7/2001 | Dahayanake et al. ........... 516/77 |
| 6,831,108 B2 | 12/2004 | Dahanayake et al. | |
| 7,373,977 B1 * | 5/2008 | Berger et al. .............. 166/270.1 |
| 7,461,694 B2 | 12/2008 | Dahanayake et al. | |
| 2003/0040546 A1 | 2/2003 | Dahanayke et al. | |
| 2004/0063587 A1 * | 4/2004 | Horton et al. ................. 507/100 |
| 2006/0128597 A1 | 6/2006 | Chen et al. | |
| 2007/0107897 A1 | 5/2007 | Dahanayake et al. | |
| 2007/0142235 A1 | 6/2007 | Berger et al. | |
| 2008/0139410 A1 * | 6/2008 | Chen et al. .................... 507/204 |

\* cited by examiner

*Primary Examiner* — George Suchfield

(57) ABSTRACT

The present invention relates to a method for the assisted recovery of crude oil from an underground formation, comprising: a) injecting, via at least one injection means in contact with the underground formation containing the crude oil, a liquid containing a mixture of at least: i) a salty aqueous medium, ii) a mixture of two zwitterionic viscosising surfactants or a mixture of two populations of said surfactants having a bimodal characteristic of the narrow distribution of Ri groups as defined below, in a weight content of between 1 and 0.05 wt %, preferably between 0.5 and 0.1 wt %, and more preferably between 0.4 and 0.15 wt %, such that the liquid has an oil/water interface tension of about 10 mN/m (milinewton per meter) or less as measured at room temperature (25° C.) and a viscosity of about 3 cPs or more as measured at a temperature of 80° C. for a shearing gradient of $10\ s^{-1}$, and corresponding to formula (1) where the two Ri radicals of the two surfactants or surfactant populations have a difference in the number of carbon atoms thereof that is at least greater than or equal to 4. The method comprises using at least one production means located at a different location than that at which the liquid or the polymer has been fed in order to recover the liquid containing the crude oil.

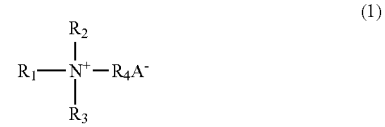

(1)

25 Claims, No Drawings

VISCOELASTIC COMPOSITION WITH IMPROVED VISCOSITY

CROSS-REFERENCE TO RELATED APPLICATIONS

This application is the U.S. National Phase of International Application No. PCT/EP2010/051633 filed on Feb. 10, 2010, which claims priority to French Application No. FR 09 01282 filed Mar. 19, 2009, both of which are incorporated by reference herein in their entireties.

FIELD OF THE INVENTION

The present invention relates to a viscoelastic composition with improved viscosity.

The invention relates to the use of viscoelastic fluids in the technique of assisted recovery of crude petroleum from subterranean formations. These fluids are obtained by addition/dissolution of a special mixture of viscosity-improving zwitterionic surfactants endowing said fluids with viscoelastic properties with improved viscosity. The invention also relates to formulations usable for methods of assisted recovery of petroleum.

BACKGROUND

Within the context of production of crude petroleum, or oil, from subterranean formations, there are various methods for optimizing the extraction of "original oil in place" (OOIP).

The primary method of production of crude petroleum comprises, once the well has been drilled, recovering the crude petroleum by migration of the petroleum from the rock or sand formation, to a well at lower pressure, then pumping it to the surface, via a "producing" well. Primary production is accordingly the least expensive method of extraction. Typically only 10 to 15% of OOIP is recovered. Nevertheless, as the oil is pumped, the pressure decreases and extraction becomes more difficult.

Secondary methods of production are used when the subterranean pressure becomes insufficient to displace the remaining oil. The commonest technique, waterflooding, uses injection wells which force a drive fluid consisting of large volumes of water under pressure into the zone containing the petroleum. During its migration from the zone to one or more producing wells, the injected water entrains a proportion of the petroleum that it encounters. At the surface, the petroleum is separated from the injected water. Waterflooding makes it possible to recover an additional 10 to 30% of OOIP.

When waterflooding reaches the point where production is no longer profitable, a decision must be taken: change of oilfield, or recourse to another phase of exploitation. It is then possible to employ a technique of assisted recovery using waterflooding in which the water contains surfactants and/or polymers. These polymers are used for increasing the viscosity of the drive fluid and thus improve the flushing of the petroleum by the drive fluid. For example, increasing the viscosity of the water by means of viscosity-improving agents, such as partially hydrolyzed polyacrylamides of high molecular weight, is known. However, these acrylic polymers have insufficient stability when the drive fluid has salinity and at application temperatures above 80/100° C.

These surfactants, which are water-dispersible and/or water-soluble, on coming into contact with the petroleum contained in the rock or sand, lower the water/oil interfacial tension, permitting entrainment of the oil trapped in the narrowed pores in the reservoir.

Thus, injection of a drive fluid making it possible both to reduce the water-oil interfacial tension to less than 1 mN/m and to maintain, in the conditions of temperature and salinity of the reservoir, a viscosity of 10 cP at shear of $10\ s^{-1}$ for a surfactant concentration below 1 wt. %, is known, as described in USA patents US 2007/0107897, US 2007/0142235 and U.S. Pat. No. 7,461,694.

The zwitterionic surfactants and notably the betaines are preferably used on account of their stability in brines. The term zwitterionic describes surfactants having a permanent positive charge regardless of the pH and having a negative charge beyond a certain pH. However, these surfactants can degrade during use at temperatures above 80/100° C. in saline oil reservoirs and the drive fluid can then suffer a loss of its viscosity-improving capacity.

There is therefore still a need for viscoelastic compositions with modified and improved properties, notably:

good stability at relatively high ionic strength, in a medium that is relatively and even very saline with 1, 3, 10 and even up to 20 wt. % of salts, generally alkali-metal and alkaline-earth-metal salts, said medium remaining pumpable after viscosity improvement;

good durability of stability and/or of thickening at relatively high temperature, in the range from 50° C., for example up to 70° C. and even 120° C. and higher, and a viscosity-improving capacity that is as effective as possible at the lowest contents of viscosity-improving zwitterionic surfactants, and a combination and/or improved compromise of at least two of these properties.

SUMMARY OF THE INVENTION

These and other aims are achieved by the present invention, which thus relates to a method of assisted recovery of petroleum from a subterranean formation comprising at least the following steps:

a) injecting, by at least one injecting means in contact with the subterranean formation containing petroleum, a drive fluid comprising a mixture of at least:
  1) a salified aqueous medium, and
  2) a mixture of 2 viscosity-improving zwitterionic surfactants or a mixture of 2 populations of these surfactants, having a bimodal character of narrow distributions of groups $R_1$ as defined below, following a content by weight between 1 and 0.05 wt. %, preferably between 0.5 and 0.1%, even more preferably between 0.4 and 0.15%, the drive fluid having an oil/water interfacial tension of about 10 mN/m (millinewton per meter) or less measured at room temperature (25° C.) and a viscosity of about 10 cP or more, measured at room temperature (25° C.) and for a shear gradient of $10\ s^{-1}$, the surfactants corresponding to formula (1):

formula 1

in which:
A⁻ represents the carboxylate COO⁻ or sulfonate $SO_3^-$ groups, $R_1$ represents a hydrophobic moiety of an alkyl, alkoxyalkyl, alkylaminoalkyl and alkylamidoalkyl group, linear or branched, saturated or, preferably, unsaturated, containing about 16 to 30, preferably 18 to 28 carbon atoms, the 2 radicals $R_1$ of the 2 surfactants or of the 2 populations of surfactants having a difference in their number of carbon atoms at least equal to or greater than 4.

$R_2$ and $R_3$ represent independently an aliphatic chain having from 1 to 30 carbon atoms, preferably from 1 to 20 carbon atoms, more preferably from 1 to 10 carbon atoms, and even more preferably from 1 to 6 carbon atoms, moreover said aliphatic group can be linear or branched, saturated or unsaturated, the preferred groups $R_2$ and $R_3$ being the methyl and hydroxymethyl, ethyl and hydroxy-2-ethyl, propyl and hydroxy-3-propyl groups, and $R_4$ is an alkylene group having from 1 to 4 carbon atoms, optionally substituted with a hydroxyl group; and b) recovering, by at least one producing means situated in a place different from the location where the drive fluid was introduced, said fluid comprising petroleum.

Completely surprisingly and unexpectedly, the present invention was able to show that the use of a mixture of surfactants or of 2 populations of viscosity-improving zwitterionic surfactants as defined above can greatly improve the viscosity of the mixture and therefore of the aqueous drive fluid. Moreover, this fluid comprising this mixture also displays a considerable improvement in its thermal stability.

DETAILED DESCRIPTION OF PREFERRED EMBODIMENTS

Specific examples of viscoelastic zwitterionic surfactants include the following structures:
In formula (1), $R_1$ can be an alkylamidopropyl, $R_2$ and $R_3$ represent a hydroxy-2-ethyl, methyl or ethyl group, $R_4$ is a methylene group divalent and A is a carboxylate group and the structures can then correspond to formula (2):

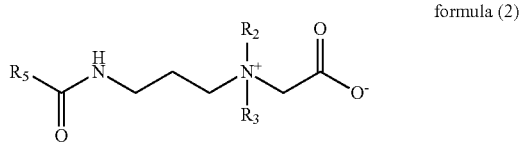

formula (2)

in which:
$R_1$ of formula (1) is the alkylamidopropyl group of formula: $R_5CONHCH_2CH_2CH_2$ in formula (2) and
the group $R_5$—C=O is a $C_{12}$-$C_{24}$ alkanoyl group. This $C_{12}$-$C_{24}$ alkanoyl group is notably selected from the dodecanoyl, tetradecanoyl (myristoyl), hexadecenoyl (cetoyl), octadecenoyl (oleoyl), octadecanoyl (stearoyl), and docosenoyl (erucoyl) groups.

According to another embodiment, in formula (1), $R_1$ is an alkylamidopropyl and the group $R_5$—C=O is a $C_{12}$-$C_{24}$ alkanoyl group notably selected from the dodecanoyl, tetradecanoyl (myristoyl), hexadecenoyl (cetoyl), octadecenoyl (oleoyl), octadecanoyl (stearoyl), and docosenoyl (erucoyl) groups.

$R_2$ and $R_3$ represent a hydroxy-2-ethyl, methyl or ethyl group, $R_4$ represents an optionally hydroxylated propylidene group, and A represents a sulfonate group and they can then for example correspond to formula (3):

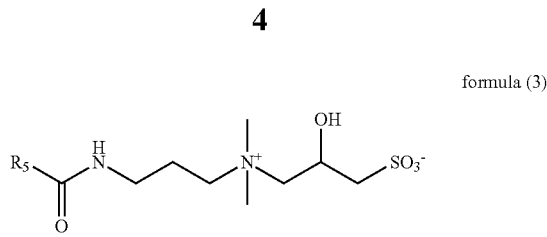

formula (3)

in which $R_2$ and $R_3$ of formula (1) represent a methyl in formula (3), $R_4$ of formula (1) represents a hydroxy-propylidene group in formula (3) and A of formula (1) represents a sulfonate group in formula (3).

According to another embodiment, in formula (1), $R_1$ is a $C_{12}$-$C_{24}$ alkyl group preferably selected from the dodecyl (lauryl), tetradecyl (myristyl), hexadecyl (cetyl), octadecenyl (oleyl), octadecyl (stearyl), docosenoic (erucyl) groups, $R_2$ and $R_3$ represent a hydroxy-2-ethyl, methyl or ethyl group, $R_4$ is a methylene group and A is a carboxylate group and the viscosity-improving surfactants can then correspond to formula (4):

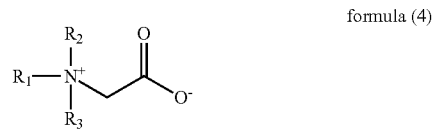

formula (4)

According to another embodiment, in formula (1), $R_1$ is a $C_{12}$-$C_{24}$ alkyl group preferably selected from the dodecyl (lauryl), tetradecyl (myristyl), hexadecyl (cetyl), octadecenyl (oleyl), octadecyl (stearyl), docosenoic (erucyl) groups, $R_2$ and $R_3$ represent a hydroxy-2-ethyl, methyl or ethyl group, $R_4$ represents an optionally hydroxylated propylidene group, and A represents a sulfonate group and the viscosity-improving surfactants can then for example correspond to formula (5):

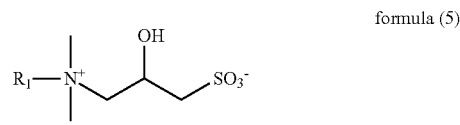

formula (5)

in which $R_2$ and $R_3$ of formula (1) represent a methyl in formula (5), $R_4$ of formula (1) represents a hydroxy-propylidene group in formula (5) and A of formula (1) represents a sulfonate group in formula (5).

According to a preferred embodiment, in formula (1), the group $R_1$ comprises at least one ethylenic unsaturation.

Moreover, the two radicals $R_1$ can have a difference in their number of carbon atoms at least equal to or greater than 4 and less than or equal to 10. Preferably the 2 viscosity-improving zwitterionic surfactants are homologues, one lower and the other higher, i.e. they have the same chemical formula and only differ in their number of carbons in group $R_1$. Moreover, the 2 viscosity-improving zwitterionic surfactants are present in the drive fluid that is injected according to a weight ratio in said fluid from 1 to 20, preferably from 1 to 10, and even more preferably from 1 to 5.

Examples of surfactants recommended for application of the invention are more particularly described in U.S. Pat. Nos. 7,461,694 and 6,831,108.

Instead of using a well-defined mixture of 2 viscosity-improving zwitterionic surfactants, it is also possible to use a mixture of 2 populations of said surfactants having a bimodal character of narrow distributions of the groups $R_1$ in alkyl chains (for example 80% of species having one and the same chain length), respectively centered on 2 values of the number of carbons in groups $R_1$ (for example 18 and 22), the difference of which leads to a number of carbon atoms at least equal to or greater than 4 carbon atoms. The present invention has been able to demonstrate a double synergy of the mixture relative to one (or one population) of surfactant(s) used alone, other things being equal, and in particular the total content of surfactants in the drive fluid injected. This synergy relates to the viscosity of the fluid, which is increased considerably and can be more than doubled.

This synergistic effect on the viscosity is therefore reflected in an appreciable increase in viscosity, compared with that obtained in the same conditions of concentration with only one of the two surfactants. The synergistic effect on viscosity is obtained over a wide range of shear and notably at gradients of velocities characteristic of the velocity of propagation of the fluids in a hydrocarbon reservoir (1 to 100 $s^{-1}$).

This synergistic effect on viscosity is observed preferably for a total concentration of zwitterionic surfactant of less than 1 wt. % in aqueous solution, more preferably less than 0.5 wt. % and even more preferably between 0.1 and 0.4 wt. %. The synergistic effect is observed independently of the salinity of the medium (fresh water, sea water, concentrated brine at 100 g/l) and of the temperature.

The unique feature of the invention is that the viscoelastic solution obtained from the specific mixture of zwitterionic surfactants makes it possible to reach, in brines, high levels of viscosity at very low concentration of surfactants. These levels of viscosity observed in brines (i.e. sea water) are higher than those obtained with partially hydrolyzed polyacrylamides of high molecular weight, serving as reference in operations of assisted recovery of hydrocarbons.

The drive fluid injected can additionally contain:
3) an alcohol or a polyol at a content by weight in the fluid similar to that of the surfactants, i.e. from 0.05 to 1%, preferably from 0.1 to 0.5%. These alcohols are preferably ethanol, isopropanol and propylene glycol.

The drive fluid injected can additionally contain:
4) a surfactant that does not endow the fluid with a viscoelastic property.

This surfactant that does not endow the fluid with a viscoelastic property can be added to the fluid to modify the viscosity-improving capacity and/or to lower the surface tension of the fluid and can be selected from anionic, cationic, nonionic, zwitterionic/amphoteric surfactants, alone or in combination. When it is present in the fluid, this surfactant that is not viscosity-improving is present at a content of 0.5 wt. % or less, preferably less than 0.2% and even 0.1 wt. % relative to the weight of the fluid, and the viscosity-improving zwitterionic surfactant is present at a content between 0.05 and 5 wt. %, preferably between 0.1 and 2 wt. %.

Moreover, the water of the injected drive fluid can be sea water, optionally freshened, a brine, fresh water or wastewater containing various metals and elements such as sodium, potassium, calcium, zinc, magnesium, etc.

The present invention also relates to a method according to the present invention, according to which the drive fluid further comprises:
5) a base in an amount sufficient to raise the pH of the fluid to a value above 10, preferably between about 11 and 13.

Completely surprisingly and unexpectedly, the present invention was able to show that addition of an alkaline compound to the drive fluid makes it possible to maintain the initial viscosity of the solution, during aging at temperatures ranging from 60 to 80° C., often 120° C. and sometimes higher, in aerobic conditions. The consequent increase in pH connected with the presence of the alkaline compound does not lead, moreover, to a significant decrease in viscosity. Besides the fact that the temperature stability is maintained, the presence of the compound allows reaction with the organic acids in the crude petroleum, thus forming secondary surfactants within the reservoir, which will allow a further reduction in interfacial tension between the injected fluid and the petroleum.

Within the context of this embodiment of the method of the invention, with addition of a base, it is also recommended to use surfactants of formula (1) above, in which the group $R_1$ further comprises at least one ethylenic unsaturation.

Within the context of this embodiment, the aqueous medium 1) used is preferably fresh water or freshened sea water, i.e. at least partially desalinated so that addition of the base does not cause excessive precipitation of the salts present in 1), thus rendering the drive fluid unusable.

The content of the base in the salt-containing aqueous fluid to be injected is sufficient to raise the pH of the fluid to a value above 10, preferably between about 11 and 13.

A suitable base can be any base, preferably mineral, selected from alkali-metal hydroxides such as sodium hydroxide or potassium hydroxide or alkaline-earth hydroxides such as calcium hydroxide. It is also possible to use ammonium hydroxide, carbonates such as sodium carbonate or bicarbonate and metaborates such as sodium metaborate. The amount of base varies depending on the nature of the various constituents of the fluid mixture to be injected, but it generally corresponds to a concentration of the base in said fluid between 0.0001 and 5 wt. %, preferably between 0.0002 and 1 wt. %. The base can be added to the fluid to be injected just before use or previously, during preparation of the alkaline mixture. According to a preferred embodiment of the invention, it is recommended to use sodium hydroxide and sodium carbonate.

In fact, owing to the presence of the base in the injected fluid, generally it is not useful to add a surfactant 4) that does not endow the fluid with viscoelastic properties.

The surprising feature of the invention is that the solution of viscoelastic surfactant combined with the single alkaline compound makes it possible both to eliminate the use of oxygen trapping agents for guaranteeing the long-term chemical stability of the drive fluid in the temperature conditions in which it is used, and to achieve ideal conditions of viscosity and lowering of the interfacial tension.

The present invention also relates to a method of assisted recovery of petroleum from a subterranean formation, wherein a viscoelastic aqueous fluid comprising at least one mixture of at least 2 viscosity-improving zwitterionic surfactants as defined above is injected into said formation, and said fluid is led through this formation to displace the petroleum from the formation and recover it at a location different from the location where the viscoelastic aqueous fluid was introduced.

The following examples illustrate the invention without limiting its scope:

EXAMPLE 1

A mixture is prepared from 2 zwitterionic surfactants derived from alkylamidopropyl betaine, one of formula:

$$H_3C\diagup(CH_2)_7\diagdown\diagup(CH_2)_{11}\diagdown\underset{\underset{O}{\parallel}}{C}-\underset{H}{N}-(CH_2)_3-\underset{\underset{CH_3}{|}}{\overset{\overset{CH_3}{|}}{N^+}}-CH_2-\underset{\underset{O^-}{}}{\overset{\overset{O}{\parallel}}{C}}$$

in which $R_1$ has 25 carbon atoms.

This product is made by reproducing example 9 of U.S. Pat. No. 6,831,108 and a lower homologue of the above product prepared in example 7 of U.S. Pat. No. 6,831,108 of formula:

$$H_3C\diagup(CH_2)_7\diagdown\diagup(CH_2)_7\diagdown\underset{\underset{O}{\parallel}}{C}-\underset{H}{N}-(CH_2)_3-\underset{\underset{CH_3}{|}}{\overset{\overset{CH_3}{|}}{N^+}}-CH_2-\underset{\underset{O^-}{}}{\overset{\overset{O}{\parallel}}{C}}$$

in which $R_1$ has 21 carbon atoms.

These 2 surfactants are dissolved in sea water (39 g/l of salt) at a temperature of 80° C. The viscosity measurements taken at a shear gradient of 10 s$^{-1}$ are compared with those obtained from only one of the two surfactants, measured in the same conditions (concentration of active ingredient, salinity, temperature). The measured values, which are presented in Tables 1 and 2 below, show that there is a range of compositions that make it possible to double, or even roughly triple, the viscosity.

TABLE 1

Viscosity ratio of zwitterionic surfactant mixture in sea water (39 g/l) at 80° C. for different compositions of the mixture.

| | | [$R_1$—$C_{21}$] (w/v) | | | | |
|---|---|---|---|---|---|---|
| | | 0.05% | 0.07% | 0.10% | 0.20% | 0.30% |
| [$R_1$—$C_{25}$] (w/v) | 0.10% | 1.05 | 0.63 | NA | NA | NA |
| | 0.20% | 2.05 | 2.04 | 1.90 | 1.21 | 0.30 |
| | 0.30% | 1.78 | 1.73 | 1.70 | 0.70 | NA |

The viscosity ratio is defined as the ratio of the viscosity of the mixture of the two surfactants to the viscosity of a solution containing only the surfactant $R_1$—$C_{25}$ at a concentration of surfactants equal to that of the mixture.

TABLE 2

Viscosity ratio of zwitterionic surfactant mixture in a brine equivalent to twice sea water (78 g/l) at 80° C. for different compositions of the mixture.

| | | [$R_1$—$C_{21}$] (w/v) | | | | | |
|---|---|---|---|---|---|---|---|
| | | 0.05% | 0.06% | 0.07% | 0.10% | 0.15% | 0.20% |
| [$R_1$—$C_{25}$] (w/v) | 0.20% | 1.45 | 1.98 | 2.88 | 2.87 | 2.35 | 2.19 |

The viscosity ratio is defined as the ratio of the viscosity of the mixture of the two surfactants to the viscosity of a solution containing only the surfactant $R_1$—$C_{25}$ at a concentration of surfactants equal to that of the mixture.

It can be seen from Tables 1 and 2 that at overall constant concentration of surfactants, the mixture of surfactants has a viscosity between about 2 and 3 times greater than that obtained with only one surfactant in sea water and in a brine equivalent to twice sea water.

The invention claims is:

1. A method for assisting recovery of petroleum from a subterranean formation comprising:
   a) injecting into the subterranean formation, a drive fluid comprising a mixture of:
      an aqueous medium comprising a salt; and
      0.05 to 5% by weight of a mixture of two viscosity-improving zwitterionic surfactants, or a mixture of two populations of zwitterionic surfactants each comprising a narrow distribution of $R_1$ groups;

wherein the zwitterionic surfactants comprise a compound of formula:

$$R_1-\underset{\underset{R_3}{|}}{\overset{\overset{R_2}{|}}{N^+}}-R_4A^-$$

wherein:
   $A^-$ comprises a carboxylate COO$^-$ or sulfonate SO$_3^-$ group;
   $R_1$ comprises a hydrophobic moiety of an alkyl, alkoxyalkyl, alkylaminoalkyl, or alkylamidoalkyl group,
      further wherein:
         $R_1$ is linear or branched and comprises about 16 to 30 carbon atoms, and
         the difference between the number of carbon atoms in radicals $R_1$ of the two zwitterionic surfactants, or of the centers of the distributions of $R_1$ groups of each of the two populations of zwitterionic surfactants, is equal to or greater than 4;
   $R_2$ and $R_3$ independently comprise an aliphatic chain having from 1 to 30 carbon atoms,
   wherein said aliphatic chain is linear or branched, saturated or unsaturated; and
   $R_4$ comprises an alkylene group having from 1 to 4 carbon atoms, optionally substituted with a hydroxyl group;
further wherein the drive fluid exhibits:
   an oil/water interfacial tension of about 10 mN/m or less at 25° C., and
   a viscosity of at least about 10 cP at 25° C. and with a shear gradient of 10 s$^{-1}$, and
b) recovering the drive fluid and the petroleum from a different location than where the drive fluid was injected.

2. The method of claim 1, wherein:
the drive fluid is injected by at least one injecting means in contact with the subterranean formation, and
the petroleum is recovered by at least one producing means.

3. The method of claim 1, wherein $R_1$ comprises an alkylamidopropyl, $R_2$ and $R_3$ comprises a hydroxy-2-ethyl, methyl or ethyl group, $R_4$ is an alkylene group, and A is a carboxylate group.

4. The method of claim 3, wherein the viscosity-improving surfactants comprise a compound of formula:

$$R_5-\underset{\underset{O}{\parallel}}{C}-\underset{H}{N}-(CH_2)_3-\underset{\underset{R_3}{|}}{\overset{\overset{R_2}{|}}{N^+}}-CH_2-\underset{\underset{O^-}{}}{\overset{\overset{O}{\parallel}}{C}}$$

wherein the group $R_5$—C=O comprises a $C_{12}$-$C_{24}$ alkanoyl group.

5. The method of claim 1, wherein the viscosity-improving surfactants comprise a compound of formula:

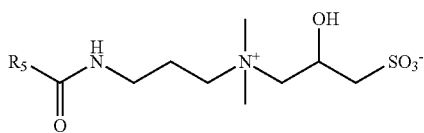

wherein the group $R_5$—C=O comprises a $C_{12}$-$C_{24}$ alkanoyl group.

6. The method of claim 4, wherein the group $R_5$—C=O comprises a dodecanoyl, tetradecanoyl (myristoyl), hexadecenoyl (cetoyl), octadecenoyl (oleoyl), octadecanoyl (stearoyl), or docosenoyl (erucoyl) group.

7. The method of claim 4, wherein $R_2$ and $R_3$ comprise a hydroxy-2-ethyl, methyl, or ethyl group.

8. The method of claim 1, wherein the viscosity-improving surfactants comprise a compound of formula:

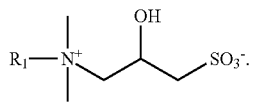

9. The method claim 1, wherein the difference between the number of carbon atoms in radicals $R_1$ of the two zwitterionic surfactants, or of the centers of the distributions of $R_1$ groups of each of the two populations of zwitterionic surfactants, ranges from 4 to 10.

10. The method of claim 1, wherein the two viscosity-improving zwitterionic surfactants are homologues, wherein one of the surfactants is a lower homologue, and the other of the surfactants is a higher homologue.

11. The method of claim 1, wherein the weight ratio of the two zwitterionic surfactants ranges from 1 to 20.

12. The method of claim 1, wherein the drive fluid further comprises an alcohol or a polyol in an amount ranging from 0.05 to 1% by weight of the drive fluid.

13. The method of claim 1, wherein the drive fluid further comprises a non-viscoelastic surfactant that does not modify the viscoelasticity of the fluid.

14. The method of claim 13, wherein the non-viscoelastic surfactant comprises an anionic, cationic, nonionic, or zwitterionic/amphoteric surfactant in an amount of 0.5% or less relative to the weight of the fluid.

15. The method of claim 13, wherein the amount of viscosity-improving zwitterionic surfactants ranges from 0.1 to 2 wt. %.

16. The method of claim 1, wherein the amount of viscosity-improving zwitterionic surfactants ranges from 0.05 to 1 wt. %.

17. The method of claim 4, wherein the zwitterionic surfactants comprises surfactants of formulas:

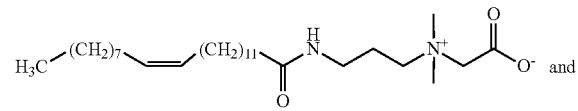 and

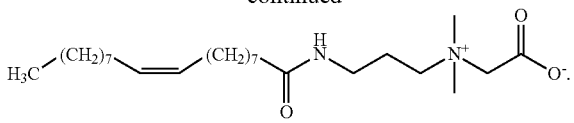

18. The method of claim 1, wherein the drive fluid further comprises a base in an amount effective to make the pH of the fluid greater than 10.

19. The method of claim 18, wherein the base comprises an alkali-metal hydroxide, a carbonate, a bicarbonate, a metaborate, or a combination thereof.

20. The method of claim 19, wherein the base comprises sodium hydroxide, potassium hydroxide, sodium carbonate, sodium bicarbonate, sodium metaborate, or a combination thereof.

21. The method of claim 18, wherein the concentration of the base in the fluid ranges from 0.0001 to 5 wt. %.

22. The method of claim 18, wherein the aqueous medium comprises fresh water or sea water that is at least partially desalinated so that the addition of base does not cause excessive precipitation of salts present therein.

23. The method claims 18, wherein group $R_1$ of one or both of the zwitterionic surfactants comprises at least one ethylenic unsaturation.

24. The method of claim 1, wherein the drive fluid further comprises:
   an alcohol or a polyol in an amount ranging from 0.05 to 1% by weight of the drive fluid;
   a non-viscoelastic surfactant that does not modify the viscoelasticity of the fluid, and
   a base in an amount effective to make the pH of the fluid greater than 10.

25. A method for recovering petroleum from a subterranean formation comprising:
   a) injecting a drive fluid into the subterranean formation, and
   b) recovering the drive fluid and the petroleum from the subterranean formation, wherein:
   the drive fluid comprises a mixture of:
      (i) an aqueous medium comprising a salt, and
      (ii) a first and second viscosity-increasing zwitterionic surfactant, and
   the zwitterionic surfactants comprise surfactants of formula:

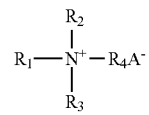

wherein:
$R_1$ comprises an alkyl, alkoxyalkyl, alkylaminoalkyl, or alkylamidoalkyl group having from 16 to 30 carbon atoms,
   wherein $R_1$ of the first zwitterionic surfactant comprises four or more carbon atoms than $R_1$ of the second zwitterionic surfactant;
$R_2$ and $R_3$ independently comprise an aliphatic chain having from 1 to 30 carbon atoms;
$R_4$ comprises an alkylene group having from 1 to 4 carbon atoms; and
$A^-$ comprises a carboxylate $COO^-$ or sulfonate $SO_3^-$ group;

further wherein the drive fluid exhibits:
- an oil/water interfacial tension of about 10 mN/m or less at 25° C., and
- a viscosity of at least about 10 cP at 25° C. and with a shear gradient of 10 $s^{-1}$.

* * * * *